US010559995B2

(12) United States Patent
Yoshida et al.

(10) Patent No.: US 10,559,995 B2
(45) Date of Patent: Feb. 11, 2020

(54) MOTOR HAVING A COVER MEMBER FOR GUIDING WATER DROPLETS AWAY FROM ROTARY ENCODER

(71) Applicant: FANUC CORPORATION, Yamanashi (JP)

(72) Inventors: Hirosato Yoshida, Yamanashi (JP); Nobuyuki Ootake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 75 days.

(21) Appl. No.: 15/906,242

(22) Filed: Feb. 27, 2018

(65) Prior Publication Data

US 2018/0254683 A1 Sep. 6, 2018

(30) Foreign Application Priority Data

Mar. 1, 2017 (JP) .................................. 2017-038552

(51) Int. Cl.
*H02K 5/10* (2006.01)
*H02K 11/21* (2016.01)
(Continued)

(52) U.S. Cl.
CPC .............. *H02K 5/10* (2013.01); *H02K 11/21* (2016.01); *H02K 9/24* (2013.01); *H02K 15/02* (2013.01); *H02K 15/14* (2013.01)

(58) Field of Classification Search
CPC . H02K 5/10; H02K 9/24; H02K 11/20; H02K 11/21; H02K 11/215; H02K 11/24
(Continued)

(56) References Cited

U.S. PATENT DOCUMENTS

| 2011/0012457 A1* | 1/2011 | Ikitake .................. H05K 7/142 310/91 |
| 2013/0154447 A1* | 6/2013 | Harada .............. G01D 5/24438 310/68 B |
| 2014/0145564 A1* | 5/2014 | Taniguchi ................ H02K 3/12 310/68 B |

(Continued)

FOREIGN PATENT DOCUMENTS

| CN | 101124973 A | 2/2008 |
| JP | S57-072749 U | 5/1982 |

(Continued)

OTHER PUBLICATIONS

An Office Action mailed by the Japanese Patent Office dated Sep. 4, 2018, which corresponds to Japanese Patent Application No. 2017-038552 and is related to U.S. Appl. No. 15/906,242; with partial English translation.

(Continued)

*Primary Examiner* — Jermele M Hollington
*Assistant Examiner* — Rashad H Johnson
(74) *Attorney, Agent, or Firm* — Studebaker & Brackett PC

(57) ABSTRACT

A motor capable of suppressing droplets of water generated due to condensation from adhering to electrical components inside a rotary encoder is provided. A motor includes: a motor main body having a rotating shaft member; and a rotary encoder, wherein the rotary encoder has a cover member, and an inner surface of the cover member has a first top surface formed having an inclined portion that is inclined relative to a horizontal direction so as to guide a droplet of water when the rotating shaft member is disposed to extend in a vertical direction, and/or a second top surface formed having an inclined portion that is inclined relative to a horizontal direction so as to guide a droplet of water when the rotating shaft member is disposed to extend in a horizontal direction.

5 Claims, 9 Drawing Sheets

(51) Int. Cl.
 *H02K 15/02* (2006.01)
 *H02K 15/14* (2006.01)
 *H02K 9/24* (2006.01)

(58) Field of Classification Search
 USPC ............... 310/52, 54, 63, 64, 68 B, 68 D, 89
 See application file for complete search history.

(56) References Cited

U.S. PATENT DOCUMENTS

| 2014/0246958 A1* | 9/2014 | Taniguchi | H02K 21/14 |
| | | | 310/68 B |
| 2019/0195666 A1* | 6/2019 | Fukuda | G01D 11/26 |

FOREIGN PATENT DOCUMENTS

| JP | H03-011355 U | 2/1991 |
| JP | 2002-325395 A | 11/2002 |
| JP | 2003-229678 A | 8/2003 |
| JP | 2005-148035 A | 6/2005 |
| JP | 2008-067575 A | 3/2008 |
| JP | 2010-170870 A | 8/2010 |
| JP | 2012-132600 A | 7/2012 |

OTHER PUBLICATIONS

Office Action issued in JP 2017-038552; mailed by the Japanese Patent Office dated Jan. 29, 2019.

Office Action issued in JP 2017-038552; mailed by the Japanese Patent Office dated Sep. 4, 2018.

An Office Action mailed by the State Intellectual Property Office of the People's Republic of China dated Apr. 30, 2019, which corresponds to Chinese Patent Application No. 201810162267.9 and is related to U.S. Appl. No. 15/906,242; with English translation.

\* cited by examiner

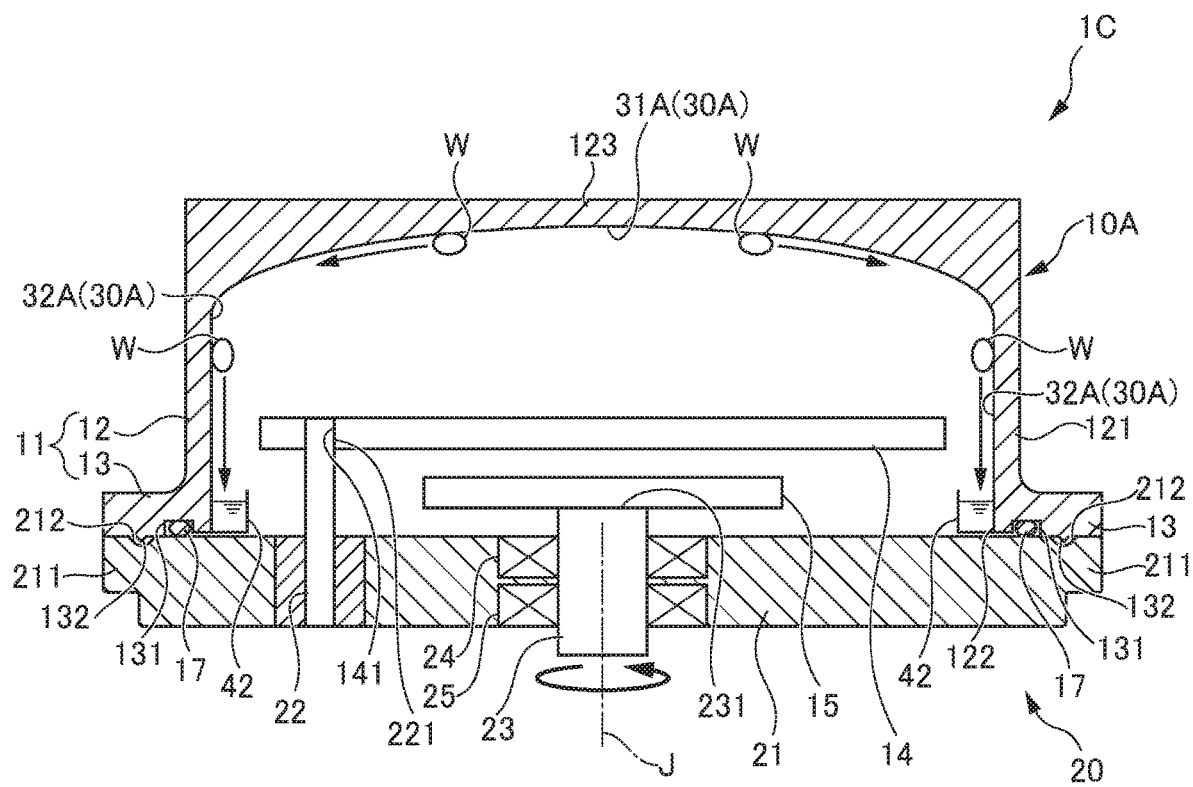
FIG. 7
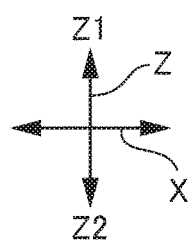

MOTOR HAVING A COVER MEMBER FOR GUIDING WATER DROPLETS AWAY FROM ROTARY ENCODER

This application is based on and claims the benefit of priority from Japanese Patent Application No. 2017-038552, filed on Mar. 1, 2017, the content of which is incorporated herein by reference.

BACKGROUND OF THE INVENTION

Field of the Invention

The present invention relates to a motor having a motor main body and a rotary encoder.

Related Art

Conventionally, a motor having a rotary encoder and a motor main body is known. In such a motor, moisture contained in a resin member or the like disposed close to a motor main body may evaporate due to heat generated by the motor main body, and condensation may occur inside a rotary encoder of which the difference in temperature from the motor main body is large (of which the temperature is relative low). When the moisture generated by condensation becomes droplets of water and adheres to a printed circuit board disposed inside the rotary encoder, an electrical short or electrolytic corrosion may occur, which may cause a fault.

In contrast, a technique for preventing condensation in a motor is known. (for example, see Patent Documents 1 and 2). In a technique disclosed in Patent Document 1, a hygroscopic material is disposed in an inner surface of a cover member of a rotary encoder. In a technique disclosed in Patent Document 2, a hygroscopic material is provided in a bearing that rotatably supports a rotating shaft member of a rotary encoder.

Patent Document 1: Japanese Unexamined Patent Application, Publication No. 2002-325395

Patent Document 2: Japanese Unexamined Patent Application, Publication No. 2005-148035

SUMMARY OF THE INVENTION

In the technologies disclosed in Patent Documents 1 and 2, a countermeasure against condensation is taken. However, it is preferable to take a countermeasure such that droplets of water generated due to condensation inside the rotary encoder do not adhere to electrical components.

An object of the present invention is to provide a motor which includes a motor main body and a rotary encoder and which can suppress droplets of water generated due to condensation from adhering to electrical components inside the rotary encoder.

(1) The present invention relates to a motor (for example, a motor 1, 1A, 1B, 1C, 1D, 1E to be described later) including: a motor main body (for example, a motor main body 20 to be described later) having a rotating shaft member (for example, a rotating shaft member 23 to be described later); and a rotary encoder (for example, a rotary encoder 10, 10A, 10B, 10C, 10D, 10E to be described later), wherein the rotary encoder has a cover member (for example, a cover member 11 to be described later), and an inner surface (for example, an inner surface 30, 30A, 30B, 30C, 30D, 30E to be described later) of the cover member has a first top surface (for example, a first inner surface 31, 31A, 31B, 31C, 31D, 31E to be described later) formed having an inclined portion that is inclined relative to a horizontal direction so as to guide a droplet of water (for example, a droplet of water W to be described later) when the rotating shaft member is disposed to extend in an up-down direction (for example, an up-down direction Z to be described later), and/or a second top surface (for example, a second inner surface 320 to be described later) formed having an inclined portion that is inclined relative to a horizontal direction so as to guide a droplet of water when the rotating shaft member is disposed to extend in a horizontal direction.

(2) In the motor according to (1), it is preferable that an inclined portion of the first top surface and/or an inclined portion of the second top surface is formed in a curved form.

(3) In the motor according to (1) or (2), it is preferable that a groove (for example, a parallel groove 33 and a radial groove 34 to be described later) for guiding a droplet of water is formed in the first top surface and/or the second top surface.

(4) In the motor according to any one of (1) to (3), it is preferable that the motor further includes a droplet-receiving portion (for example, a droplet-receiving portion 41, 42 to be described later) disposed in an inner surface of the cover member to receive and store the droplet of water guided by the inner surface of the cover member.

(5) In the motor according to any one of (1) to (4), it is preferable that the motor further includes a hygroscopic material (for example, a hygroscopic material 16, 16A, 16B to be described later) disposed in an inner surface of the cover member to absorb the guided droplet of water.

(6) In the motor according to any one of (1) to (5), it is preferable that a surface of the first top surface and/or the second top surface has a water-repellent property.

According to the present invention, it is possible to provide a motor which includes a motor main body and a rotary encoder and can suppress droplets of water generated due to condensation from adhering to electrical components inside the rotary encoder.

BRIEF DESCRIPTION OF THE DRAWINGS

FIG. 7 is a diagram illustrating a fourth modified embodiment of the second embodiment and is a diagram illustrating a configuration in which a droplet-receiving portion is disposed in a lower-end portion of the second inner surface of the cover member.

DETAILED DESCRIPTION OF THE INVENTION

Figure 1:
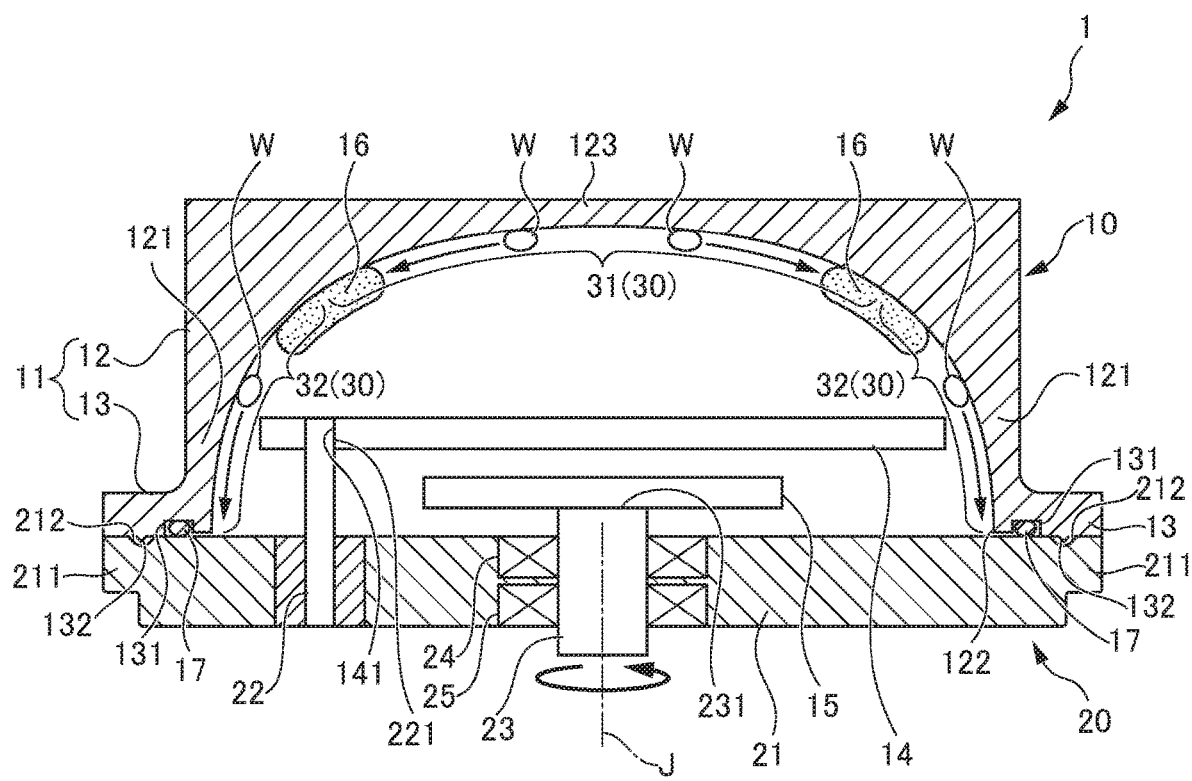
FIG. 1 is a diagram illustrating a motor of a first embodiment of the present invention and is a cross-sectional view illustrating a case in which a rotating shaft member is disposed to extend in an up-down direction.

Hereinafter, embodiments of the present invention will be described with reference to the drawings. In the descriptions of the second and subsequent embodiments, constituent elements that are the same as those of the first embodiment will be denoted by the same reference numerals and descriptions thereof will be omitted.

First Embodiment

Figure 2:
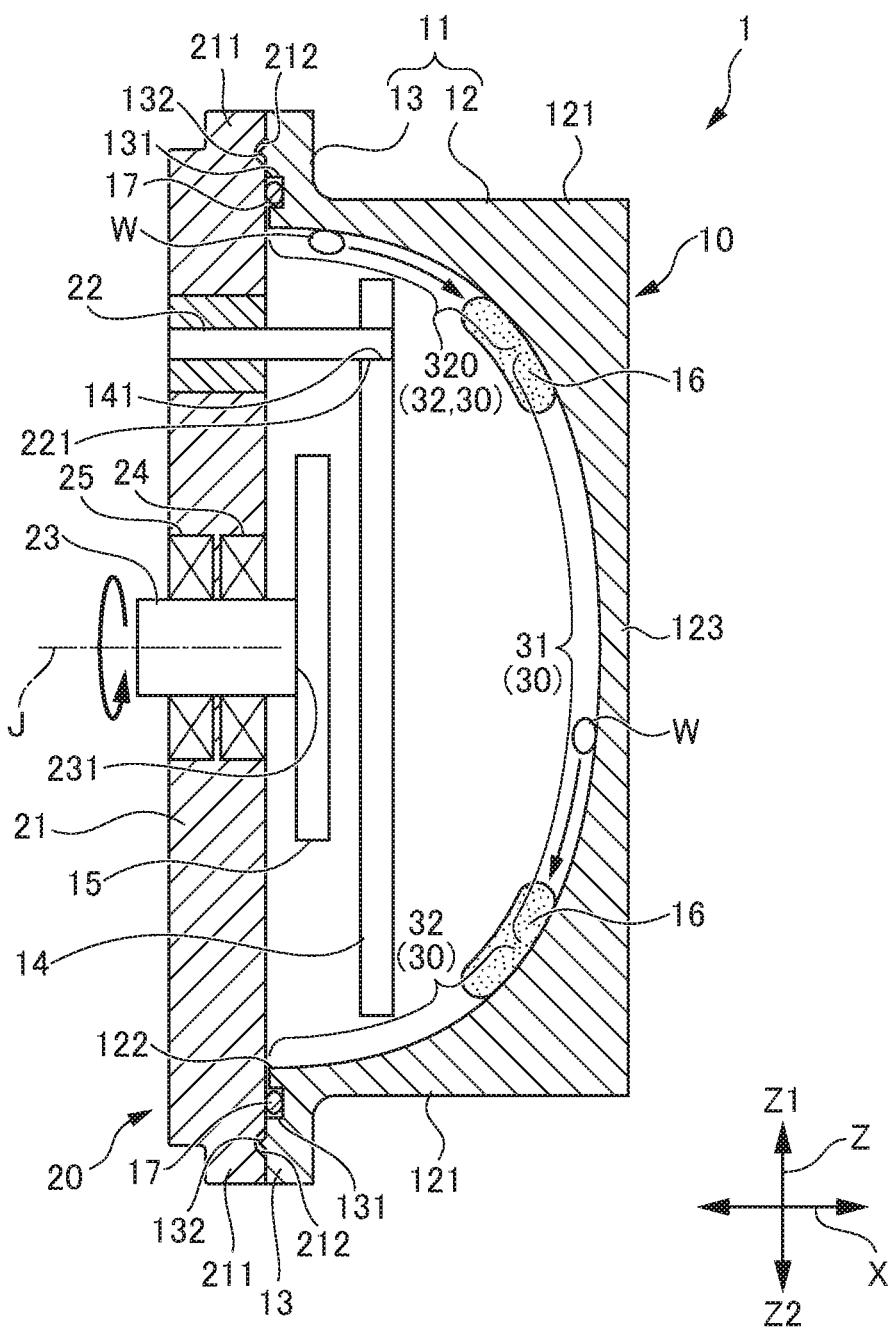
FIG. 2 is a diagram illustrating a motor of the first embodiment of the present invention and is a cross-sectional view illustrating a case in which a rotating shaft member is disposed to extend in a horizontal direction.

A motor 1 according to the first embodiment will be described. FIG. 1 is a diagram illustrating a motor 1 of the first embodiment of the present invention and is a cross-sectional view illustrating a case in which a rotating shaft member 23 is disposed to extend in an up-down direction Z. FIG. 2 is a diagram illustrating the motor 1 of the first embodiment of the present invention and is a cross-sectional view illustrating a case in which the rotating shaft member 23 is disposed to extend in a horizontal direction X. In the description of the present embodiment, a vertical direction will be referred to as the "up-down direction Z." An upper side in the up-down direction Z will be referred to as an "upper side Z1" and a lower side will be referred to as a "lower side Z2." Moreover, a horizontal direction will be referred to as the "horizontal direction X."

As illustrated in FIG. 1, the motor 1 includes a rotary encoder 10 and a motor main body 20. The rotary encoder 10 is attached to the motor main body 20 and is electrically connected to the motor main body 20.

First, the motor main body 20 will be described. As illustrated in FIG. 1, the motor main body 20 includes a main body-side housing 21, a main body-side connector 22, and a rotating shaft member 23.

The main body-side housing 21 is formed in a thick planar form. The main body-side housing 21 has a main body-side flange 211 that protrudes outward. The main body-side flange 211 is disposed to face a cover member flange 13 of a cover member 11 to be described later. In the main body-side housing 21, a position-determining concave portion 212 is formed on a surface of the main body-side flange unit 211 facing the rotary encoder 10. A position-determining convex portion 132 to be described later of the rotary encoder 10 fits into the position-determining concave portion 212.

The rotating shaft member 23 protrudes and extends toward the rotary encoder 10 in a state of being supported by bearings 24 and 25. The rotating shaft member 23 is configured to be rotatable around a rotating shaft J. A rotating slit plate 15 to be described later of the rotary encoder 10 is connected to a distal end 231 of the rotating shaft member 233.

The main body-side connector 22 is disposed at a position separated by a predetermined distance in a radial direction from the rotating shaft J of the main body-side housing 21 so as to protrude and extend toward the rotary encoder 10 in parallel to an axial direction (the extension direction of the rotating shaft member 23) of the rotating shaft member 23.

A main body-side contact 221 is formed at a distal end of the main body-side connector 22. The main body-side contact 221 is disposed at a position separated by a predetermined distance from the rotating shaft J of the main body-side housing 21 so as to make contact with a board-side contact portion 141 of a printed circuit board 14 of the rotary encoder 10. In this way, the main body-side connector 22 is electrically connected to the printed circuit board 14.

Next, the rotary encoder 10 will be described. As illustrated in FIG. 1, the rotary encoder 10 includes a cover member 11, a printed circuit board 15, a rotating slit plate 15, and a hygroscopic material 16.

The cover member 11 has a cover member main body 12 and a cover member flange 13. The cover member main body 12 has a circumferential wall 121 formed in an annular form along the rotational direction of the rotating shaft member 23 outside the radial direction, an opening 122 formed on one side in the extension direction of the rotating shaft member 23, and a closed portion 123 formed on the other side in the extension direction of the rotating shaft member 23. The opening 122 of the cover member main body 12 is closed by the main body-side housing 21 of the motor main body 20.

The cover member flange 13 is formed to protrude outward from the rim of the opening 122 of the cover member main body 12. A surface of the cover member flange 13 facing the motor main body 20 is disposed in contact with a surface of the main body-side flange 211 of the motor main body 20 facing the rotary encoder 10.

An O-ring-receiving recessed groove 131 and the position-determining convex portion 132 are formed on a surface of the cover member flange 13 facing the main body-side housing 21 of the motor main body 20. The position-determining convex portion 132 fits into the position-determining concave portion 212 of the main body-side flange 211. In this way, when the cover member 11 is attached to the main body-side housing 21 of the motor main body 20, the position-determining convex portion 132 performs position determination of the radial direction of the cover member 11.

The O-ring-receiving recessed groove 131 is formed over the entire region in the circumferential direction of the cover member flange 13. An O-ring 17 is received in the O-ring-receiving recessed groove 131. The O-ring 17 makes contact with a surface of the main body-side flange 211 facing the rotary encoder 10 on an outer circumference side of the main body-side housing 21 of the motor main body 20 in a state of being received in the O-ring-receiving recessed groove 131. The O-ring 17 seals the motor main body 20 and the rotary encoder 10 at the rim of the opening 122 of the cover member 11. In this way, water-tightness between the motor main body 20 and the rotary encoder 10 is secured.

An outer shape of the cover member main body 12 is different from the shape of the inner surface 30. In the outer shape of the cover member main body 12, an outer shape of the closed portion 123 is formed in an octagonal shape in a planar view, and an outer shape of the circumferential wall 121 is formed in an octagonal shape. The shape of the inner surface 30 of the cover member main body 12 is formed in a dome shape due to an inner surface of a portion of the cover member main body 12 being depressed inward from the opening 122 that opens in a circular form. The hygroscopic material 16 is bonded to the inner surface 30 of the cover member main body 12. The shape of the inner surface 30 of the cover member main body 12 and the details of the hygroscopic material 16 will be described later.

As illustrated in FIG. 1, the printed circuit board 14 and the rotating slit plate 15 are disposed inside the cover member main body 12.

The rotating slit plate 15 is formed in a disk shape extending in a radial direction of the cover member 11. The distal end 231 of the rotating shaft member 23 of the motor main body 20 is connected to the center of the rotating slit plate 15. The rotating slit plate 15 rotates when the rotating shaft member 23 of the motor main body 20 rotates. A slit (not illustrated) that is detected by a sensor detector (not illustrated) disposed in the printed circuit board 14 is formed in the rotating slit plate 15.

The printed circuit board 14 is disposed on a surface of the rotating slit plate 15 on the opposite side from the side to which the rotating shaft member 23 of the motor main body 20 is connected. The printed circuit board 14 is disposed to be separated from the rotating slit plate 15 and in parallel to the rotating slit plate 15.

The printed circuit board 14 is formed in a planar form extending in the radial direction of the cover member 11. The printed circuit board 14 has electronic components (not illustrated) such as a sensor detector (not illustrated) mounted thereon. In the present embodiment, the printed circuit board 14 and the electronic components (not illustrated) mounted on the printed circuit board 14 form electrical components accommodated inside the cover member 11 of the rotary encoder 10. The sensor detector (not illustrated) detects the slit (not illustrated) of the rotating slit plate 15 to output a sensor detection signal when the rotating slit plate 15 rotates. The printed circuit board 14 has a board-side contact portion 141. The main body-side contact 221 of the main body-side connector 22 is electrically connected to the board-side contact portion 141. The board-side contact portion 141 is a terminal that inputs and outputs a sensor signal detected by the sensor detector (not illustrated) and other electrical signals.

The shape of the inner surface 30 of the cover member main body and the details of the hygroscopic material 16 will be described. Conventionally, in a motor, moisture contained in a resin member or the like disposed close to a motor main body may evaporate due to heat generated by the motor main body, and condensation may occur inside a rotary encoder of which the difference in temperature from the motor main body is large (of which the temperature is relatively low). When the moisture generated by condensation becomes droplets of water and falls by adhering to the inner surface of a case member of the rotary encoder, the moisture may fall on a printed circuit board disposed inside the rotary encoder and adhere to the printed circuit board. In this case, an electrical short or electrolytic corrosion may occur in the printed circuit board of the rotary encoder, which may cause a fault.

In contrast, in the present invention, the shape of the inner surface 30 of the cover member 11 is configured as below. As described above and as illustrated in FIGS. 1 and 2, the inner surface 30 of the cover member main body 12 is formed in a dome shape. The inner surface 30 of the cover member 11 has a first inner surface 31 (a first top surface) and a second inner surface 320.

Here, the motor 1 of the present embodiment can be used when the rotating shaft member 23 is disposed to extend in the up-down direction Z relative to the arrangement direction of the motor 1 (see FIG. 1) and when the rotating shaft member 23 is disposed to extend in the horizontal direction X relative to the arrangement direction (see FIG. 2). In the present embodiment, the up-down direction Z is also a vertical direction.

As illustrated in FIG. 1, the first inner surface 31 is a top surface serving as a ceiling-side surface of the inner surface 30 of the cover member 11 when the rotating shaft member 23 is disposed to extend in the up-down direction Z relative to the arrangement direction of the motor 1. The first inner surface 31 is formed having an inclined portion that is inclined relative to a horizontal direction so as to guide a droplet of water W adhering to the first inner surface 31 when the rotating shaft member 23 is disposed to extend in the up-down direction Z. The expression "inclined" may mean a generally inclined state and may include a state of being inclined in a curved form without being limited to a state of being inclined in a planar form. The inclined portion of the first inner surface 31 is formed in a curved form.

Specifically, as illustrated in FIG. 1, the first inner surface 31 is formed in a curved form that is inclined so as to descend from the closed portion 123 toward the opening 122 as it advances from the center in the radial direction of the inner surface 30 of the cover member 11 toward the outer rim when the rotating shaft member 23 is disposed to extend in the up-down direction Z relative to the arrangement direction of the motor 1. As illustrated in FIG. 1, the droplet of water W adhering to the first inner surface 31 moves from the upper side Z1 toward the lower side Z2 along the inclined curved surface of the first inner surface 31 when the rotating shaft member 23 is disposed to extend in the up-down direction Z.

As illustrated in FIG. 1, the second inner surface 32 is a lateral side surface of the inner surface 30 of the cover member 11 when the rotating shaft member 23 is disposed to extend in the up-down direction Z relative to the arrangement direction of the motor 1. The second inner surface 32 is formed having an inclined portion that is inclined relative to a horizontal direction so as to guide a droplet of water W adhering to the second inner surface 32 when the second rotating shaft member 23 is disposed to extend in the up-down direction Z. The inclined portion of the first inner surface 31 is formed in a curved form.

Specifically, as illustrated in FIG. 1, the second inner surface 32 is formed in a curved form that is inclined so as to descend from the closed portion 123 toward the opening 122 as it advances from the center in the radial direction of the inner surface 30 of the cover member 11 toward the outer rim when the rotating shaft member 23 is disposed to extend in the up-down direction Z relative to the arrangement direction of the motor 1. As illustrated in FIG. 1, when the rotating shaft member 23 is disposed to extend in the up-down direction Z the droplet of water W adhering to the second inner surface 32 moves from the upper side Z1 toward the lower side Z2 along the inclined curved surface of the second inner surface 32 and is guided to the outer rim in the radial direction of the inner surface 30 of the cover member 11.

As illustrated in FIG. 2, a second inner surface 320 (a second top surface) among the second inner surfaces 32, disposed on the upper side Z1 when the motor 1 is rotated clockwise by 90° from the state illustrated in FIG. 1 relative to the arrangement direction of the motor 1 so that the rotating shaft member 23 is disposed to extend in the horizontal direction X, is a top surface serving as a ceiling-side surface of the inner surface 30 of the cover member 11. The second inner surface 320 is formed having an inclined portion that is inclined relative to a horizontal direction so as to guide a droplet of water W adhering to the second inner surface 320 when the rotating shaft member 23 is disposed to extend in the horizontal direction X. The inclined portion of the second top surface 320 is formed in a curved form.

Specifically, as illustrated in FIG. 2, the second inner surface 320 is formed in a curved form that is inclined so as to descend from the rim of the inner surface 30 of the cover member 11 toward the center in the radial direction as it advances from the opening 122 of the inner surface 30 of the cover member 11 toward the closed portion 123 when the rotating shaft member 23 is disposed to extend in the horizontal direction X relative to the arrangement direction of the motor 1. As illustrated in FIG. 2, when the rotating shaft member 23 is disposed to extend in the horizontal direction X, the droplet of water W adhering to the second inner surface 320 moves from the upper side Z1 toward the lower side Z2 along the inclined curved surface of the second inner surface 320.

As illustrated in FIG. 2, the first inner surface 31 is a side surface of the inner surface 30 of the cover member 11 facing the closed portion 123 when the rotating shaft member 23 is disposed to extend in the horizontal direction X relative to the arrangement direction of the motor 1. The first inner surface 31 is formed in a curved form such that a portion of the inner surface 30 of the cover member 11 corresponding to the closed portion 123 at the center in the radial direction of the cover member 11 is inclined in a state of being depressed in an arc form. As illustrated in when the rotating shaft member 23 is disposed to extend in the horizontal direction X, the droplet of water W adhering to the first inner surface 31 moves from the upper side Z1 toward the lower side Z2 along the inclined curved surface of the first inner surface 31.

The hygroscopic material 16 is disposed in a place where the droplets of water W guided by the first and second inner surfaces 31 and 320 gather. The hygroscopic material 16 absorbs the droplets of water W guided by the first and second inner surfaces 31 and 320. In the present embodiment, the hygroscopic material 16 is formed in a sheet form, for example, and is formed in a form such as, for example, a circular form, a semi-circular form, or a ring form when seen in a direction facing the inner surface 30 of the cover member 11.

In the present embodiment, as illustrated in FIGS. 1 and 2, the hygroscopic material 16 is disposed to be bonded to the first and second inner surfaces 31 and 320 at the boundary between the first and second inner surfaces 31 and 320 of the inner surface 30 of the cover member 11. Examples of the hygroscopic material 16 include a water absorbent such as zeolites.

In the cover member 11 and the hygroscopic material 16 of the rotary encoder 10 configured in the above-described manner, when the rotating shaft member 23 is disposed to extend in the up-down direction Z relative to the arrangement direction of the motor 1, the droplet of water W adhering to the first inner surface 31 moves from the upper side Z1 toward the lower side Z2 along the inclined curved surface of the first inner surface 31 and is guided toward the outer rim in the radial direction of the cover member 11 as illustrated in FIG. 1. The hygroscopic material 16 is disposed on the outer rim of the first inner surface 31 in the radial direction of the cover member 11 in a place where the droplet of water W guided by the first inner surface 31 has moved. Since the hygroscopic material 16 is disposed at a position to which the droplets of water W are guided, the hygroscopic material 16 can absorb the droplets of water W guided by the first inner surface 31 effectively.

When the rotating shaft member 23 is disposed to extend in the horizontal direction X relative to the arrangement direction of the motor 1, the droplet of water W adhering to the upper side Z1 of the second inner surface 320 moves from the upper side Z1 toward the lower side Z2 along the inclined curved surface of the second inner surface 320 and is guided toward the second inner surface 320 disposed on the side of the closed portion 123 of the cover member 11 as illustrated in FIG. 2. The hygroscopic material 16 is disposed at the boundary between the first and second inner surfaces 31 and 320 in a place where the droplets of water W guided by the second inner surface 320 have moved. Due to this, since the hygroscopic material 16 is disposed at a position where the droplets of water W are guided, the hygroscopic material 16 can absorb the droplets of water W guided by the second inner surface 320 effectively.

According to the motor 1 of the first embodiment having the above-described configuration, the following advantages are provided. The motor 1 of the present embodiment includes the motor main body 20 having the rotating shaft member 23 and the rotary encoder 10. The rotary encoder 10 has the cover member 11. The inner surface of the cover member 11 has the first inner surface 31 formed having an inclined portion that is inclined relative to a horizontal direction so as to guide a droplet of water W when the rotating shaft member 23 is disposed to extend in the up-down direction Z and the second inner surface 320 formed having an inclined portion that is inclined relative to a horizontal direction so as to guide a droplet of water W when the rotating shaft member 23 is disposed to extend in the horizontal direction X. The inclined portion of the first inner surface 31 and the inclined portion of the second inner surface 320 are formed in a curved form.

Due to this, even when the rotating shaft member 23 is disposed to extend in the up-down direction Z relative to the arrangement direction of the motor 1 (see FIG. 1), or the rotating shaft member 23 is disposed to extend in the horizontal direction X (see FIG. 2), the droplets of water W adhering to the inner surface 30 of the cover member 11 can be guided along the inclined curved surface of the first and second inner surfaces 31 and 320. Therefore, it is possible to guide the droplets of water W adhering to the inner surface 30 of the cover member 11 regardless of the arrangement direction of the motor 1. In this way, it is possible to suppress the droplets of water W from falling onto the printed circuit board 14 and to suppress the droplets of water W from adhering to electronic components such as the printed circuit board 14.

In the present embodiment, the rotary encoder further includes the hygroscopic material 16 that is disposed in the inner surface 30 of the cover member 11 to absorb the guided droplets of water W. Due to this, the droplets of water W guided by the first or second inner surface 31 or 320 can be absorbed by the hygroscopic material 16. In this way, it is possible to prevent the droplets of water W from adhering to the electronic components. Since the hygroscopic material 16 is disposed at a position where the droplets of water W are guided, it is possible to decrease the number of places where the hygroscopic material 16 is disposed and thereby reduce the amount of the hygroscopic material 16 that is used.

The hygroscopic material 16 is provided at the boundary between the first and second inner surfaces 31 and 320 when the motor 1 is used and disposed in a state in which the rotating shaft member 23 is disposed to extend in the up-down direction Z or the horizontal direction X. In this way, the hygroscopic material 16 can be used as a member that absorbs the droplets of water W guided by both the inclined curved surfaces of the first and second inner surfaces 31 and 320.

Second Embodiment

Figure 3:
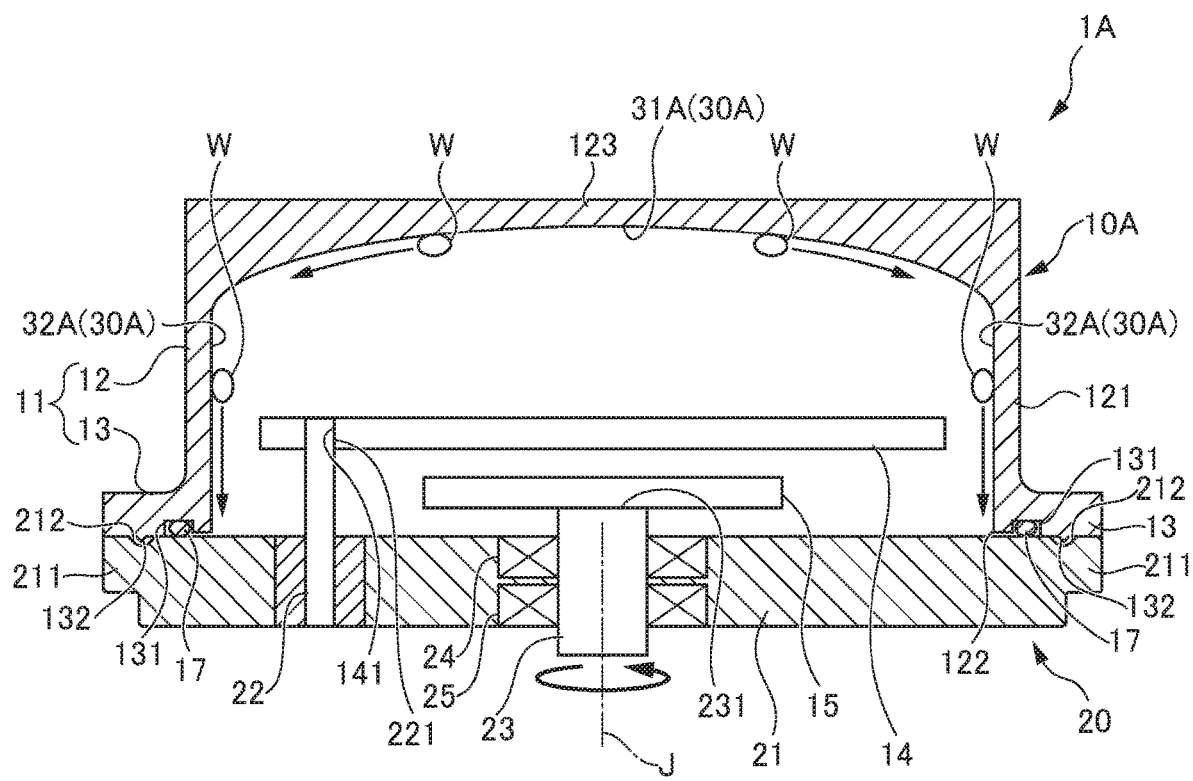
FIG. 3 is a diagram illustrating a motor of a second embodiment of the present invention and is a cross-sectional view illustrating a case in which a rotating shaft member is disposed to extend in an up-down direction.
Figure 3:
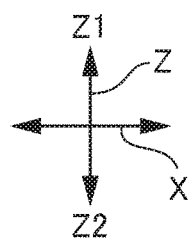

A motor 1A according to a second embodiment will be described. FIG. 3 is a diagram illustrating the motor 1A of the second embodiment of the present invention and is a cross-sectional view illustrating a case in which the rotating shaft member 23 is disposed to extend in the up-down direction Z. The second embodiment is applied when the rotating shaft member 23 is disposed to extend in the up-down direction Z relative to the arrangement direction of the motor 1A.

As illustrated in FIG. 3, the second embodiment is different from the first embodiment in that an inner surface 30A is provided instead of the configuration of the inner surface 30 of the first embodiment. The second embodiment is also different from the first embodiment in that the hygroscopic material 16 of the first embodiment is not provided. In the description of the second embodiment, descriptions of the same constituent elements as those in the first embodiment will be omitted.

The inner surface 30 of the cover member 11 of the first embodiment has the second inner surface 32 that rises in a state of being inclined from the upper surface of the main body-side housing 21 of the motor main body 20. In contrast, the inner surface 30A of the cover member 11 of the second embodiment has a second inner surface 32A that rises vertically from the upper surface of the main body-side housing 21 of the motor main body 20.

The second inner surface 32A of the second embodiment is formed so as to rise vertically from the upper surface of the main body-side housing 21 of the motor main body 20 and extend in a vertical direction when the rotating shaft member 23 is disposed to extend in the up-down direction Z relative to the arrangement direction of the motor 1A. The first inner surface 31A of the second embodiment is formed on the outer side in the radial direction with a smaller inclination angle than the inclination angle of the first inner surface 31 of the first embodiment. A groove or the like is not formed on the surface of the first inner surface 31A of the second embodiment.

Since the first and second inner surfaces 31A and 32A are configured in the above-described manner, when the rotating shaft member 23 is disposed to extend in the up-down direction Z relative to the arrangement direction of the motor 1A, the droplet of water W adhering to the first inner surface 31A moves from the upper side Z1 toward the lower side Z2 along the inclined curved surface of the inner surface 31A and is guided toward the outer rim in the radial direction of the cover member 11. In this way, the droplet of water W guided toward the outer side in the radial direction of the cover member 11 moves from the upper side toward the lower side along the second inner surface 32A. Therefore, in the motor 1A of the second embodiment, the droplet of water W adhering to the inner surface 30A of the cover member 11 can be guided toward the outer rim in the radial direction of the cover member 11. In this way, it is possible to suppress the droplet of water W from falling onto the printed circuit board 14.

First and Second Modified Embodiments of Second Embodiment

Next, a first modified embodiment and a second modified embodiment of the second embodiment will be described.

Figure 4:
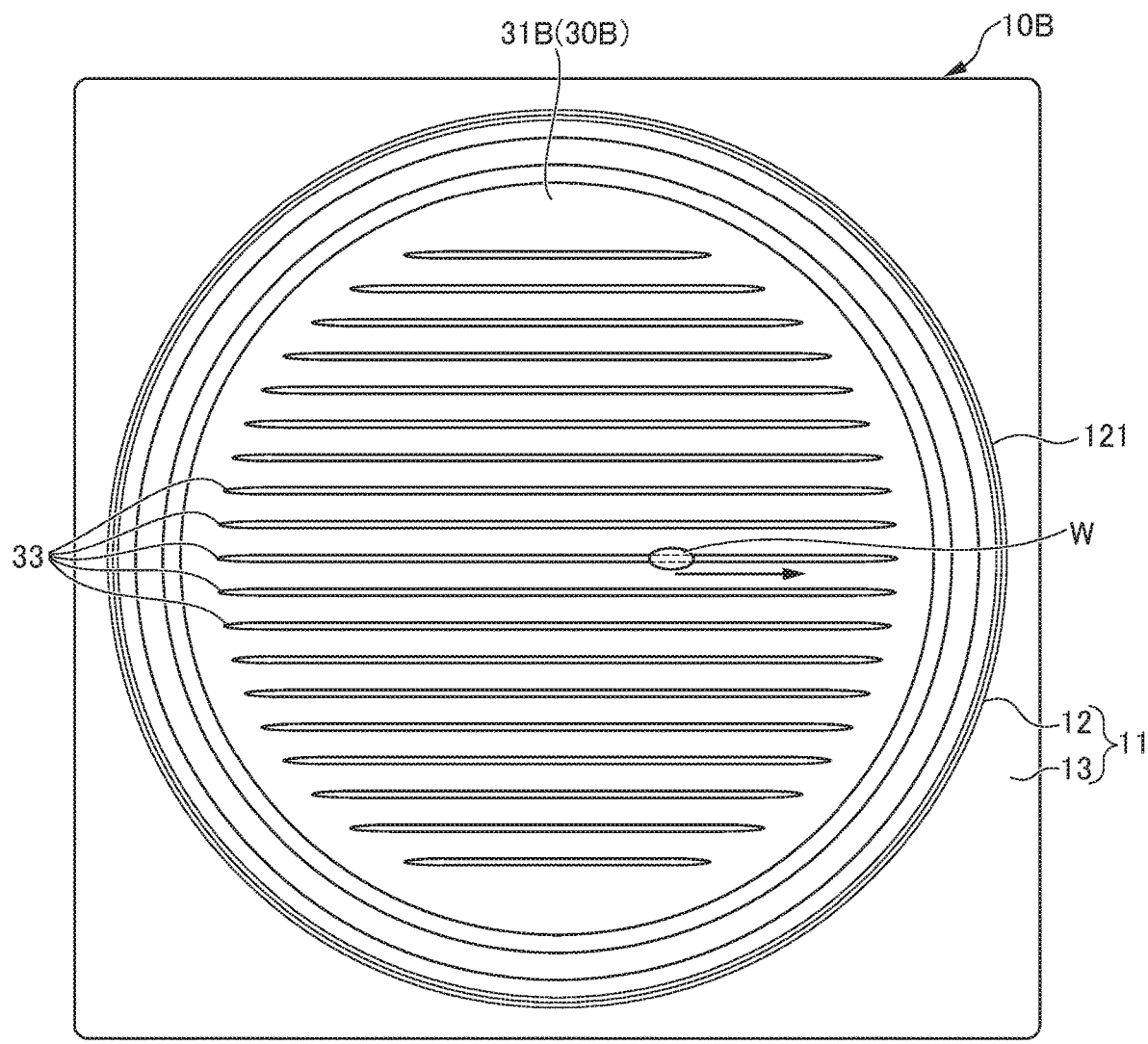
FIG. 4 is a diagram illustrating a first modified embodiment of the second embodiment and is a diagram illustrating a configuration of a parallel groove formed in a first inner surface of a cover member.
Figure 5:
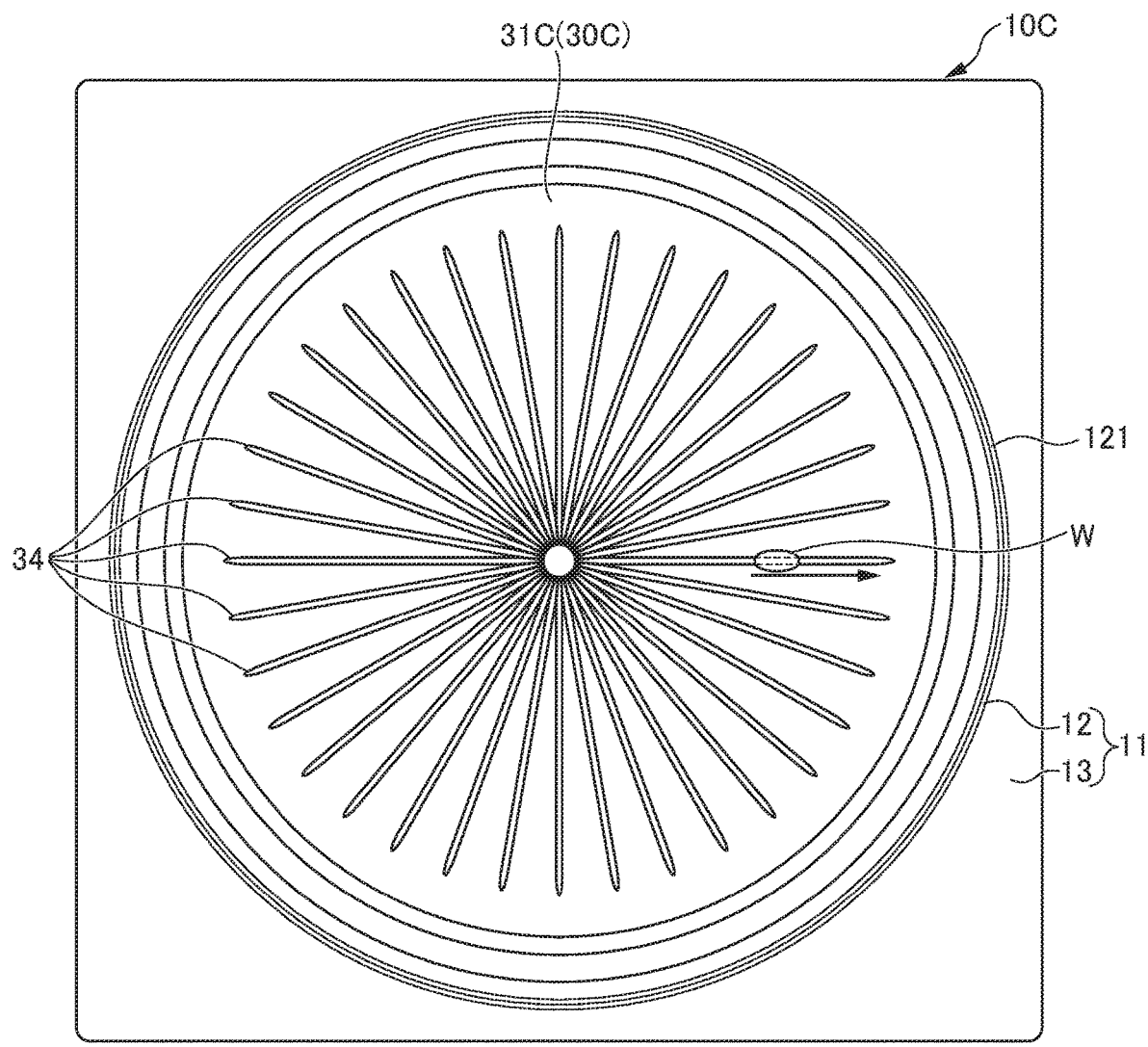
FIG. 5 is a diagram illustrating a second modified embodiment of the second embodiment and is a diagram illustrating a configuration of a radial groove formed in the first inner surface of the cover member.

FIG. 4 is a diagram illustrating a first modified embodiment of the second embodiment and is a diagram illustrating a configuration of a parallel groove 33 formed in a first inner surface 31B of the cover member 11. FIG. 5 is a diagram illustrating a second modified embodiment of the second embodiment and is a diagram illustrating a configuration of a radial groove 34 formed in a first inner surface 31C.

In the first and second modified embodiments of the second embodiment, unlike the surface of the first inner surface 31A of the second embodiment, the parallel groove 33 or the radial groove 34 for guiding the droplet of water W is formed in the first inner surface 31B of the cover member 11 as illustrated in FIGS. 4 and 5.

As illustrated in FIG. 4, in the first modified embodiment of the second embodiment, the parallel groove 33 formed of a plurality of linear grooves parallel to a straight line passing through the center in the radial direction of the cover member 11 is formed in the first inner surface 31B of the inner surface 30B of the cover member 11. The plurality of grooves forming the parallel groove 33 are formed in a width that is narrower than the size of the droplet of water W. Since the width of the grooves forming the parallel groove 33 is narrower than the size of the droplet of water W, the droplet of water W easily moves along the parallel groove 33 due to the surface tension of the droplet of water W. Particularly, since the first inner surface 31B is formed to be inclined in a curved form, the droplet of water W moves in an inclination direction of the first inner surface 31B and moves along the parallel groove 33. Due to this, the parallel groove 33 of the first inner surface 31B can easily guide the droplet of water W adhering to the first inner surface 31B of the cover member 11 toward the outer side in the radial direction of the cover member 11.

Therefore, in the first modified embodiment of the second embodiment, since the first inner surface 31B is inclined and the plurality of grooves forming the parallel groove 33 is formed in the first inner surface 31B of the cover member 11, the droplet of water W adhering to the inner surface 30B of the cover member 11 can be guided along the parallel groove 33 of the inclined curved surface of the inner surface 31B. Therefore, the droplet of water W adhering to the first inner surface 31B of the cover member 11 is easily guided toward the outer rim in the radial direction of the cover member 11. Due to the parallel groove 33, it is possible to suppress the droplet of water W adhering to the first inner surface 31B of the cover member 11 from growing to a size necessary for the droplet of water W to fall and to allow the droplet of water W to move along the parallel groove 33. Due to this, it is possible to further suppress the droplet of water W adhering to the first inner surface 31B of the cover member 11 from falling.

As illustrated in FIG. 5, in the second modified embodiment of the second embodiment, the radial groove 34 formed of a plurality of linear grooves extending in a radial form around the center in the radial direction of the cover member 11 is formed in the first inner surface 31C of the inner surface 30C of the cover member 11. The plurality of grooves forming the radial groove 34 are formed in a width narrower than the size of the droplet of water W. Since the width of the grooves forming the radial groove 34 is narrower than the size of the droplet of water W, the droplet of water W easily moves along the radial groove 34 due to the surface tension of the droplet of water W. Particularly, since the first inner surface 31C is formed to be inclined in a curved form, the droplet of water W moves in the inclination direction of the inner surface 31C and moves along the radial groove 34. Due to this, the radial groove 34 of the first inner surface 31C can easily guide the droplet of water W adhering to the first inner surface 31C of the cover member 11 toward the outer side in the radial direction of the cover member 11.

Therefore, in the second modified embodiment of the second embodiment, since the first inner surface 31C is inclined and the plurality of grooves forming the radial groove 34 is formed to extend in a radial form, the droplet of water W adhering to the inner surface 30C of the cover member 11 can be guided along the radial groove 34 of the inclined curved surface of the first inner surface 31C. Therefore, the droplet of water W adhering to the first inner surface 31C of the cover member 11 is easily guided toward the outer rim in the radial direction of the cover member 11. Due to the radial groove 34, it is possible to suppress the droplet of water W adhering to the first inner surface 31C of the cover member 11 from growing to a size necessary for the droplet of water W to fall and to allow the droplet of water W to move along the radial groove 34. Due to this, it is possible to further suppress the droplet of water W adhering to the first inner surface 31C of the cover member 11 from falling.

Third and Fourth Modified Embodiments of Second Embodiment

Figure 6:
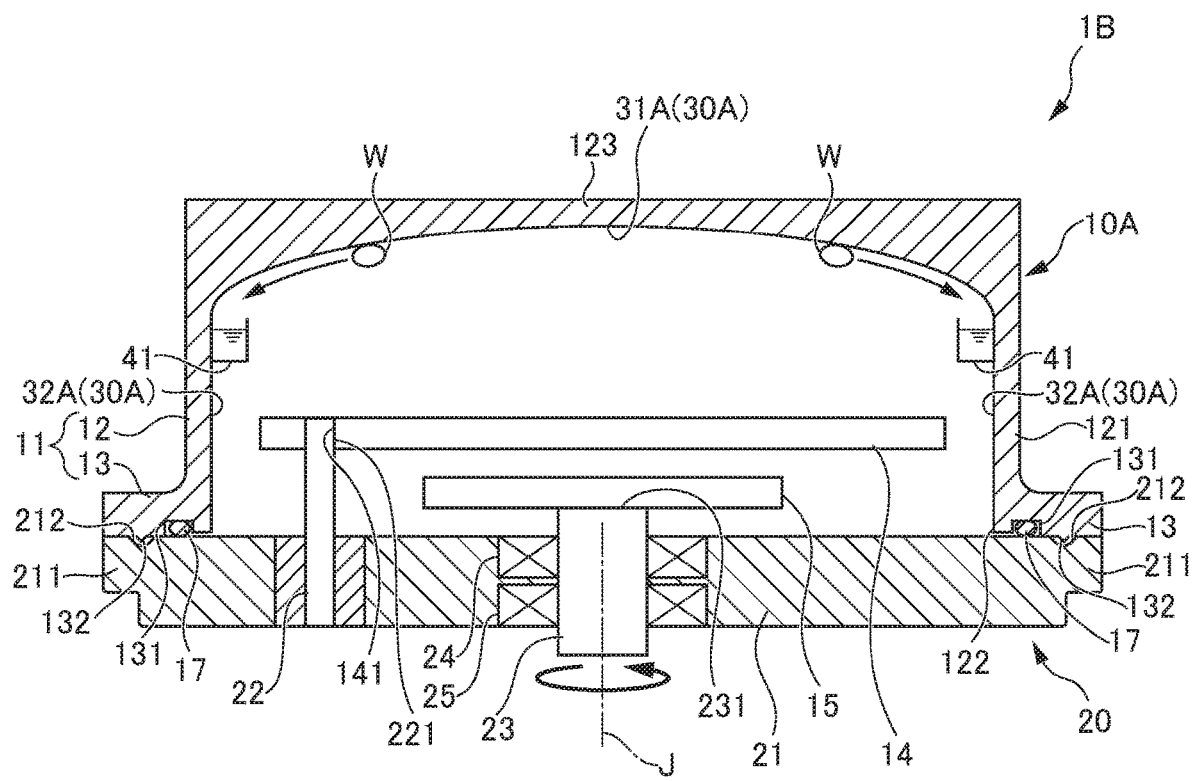
FIG. 6 is a diagram illustrating a third modified embodiment of the second embodiment and is a diagram illustrating a configuration in which a droplet-receiving portion is disposed in an upper-end portion of a second inner surface of the cover member.

Next, a third modified embodiment and a fourth modified embodiment of the second embodiment will be described. FIG. 6 is a diagram illustrating a third modified embodiment of the second embodiment and is a diagram illustrating a configuration in which a droplet-receiving portion 41 is disposed in an upper-end portion of the second inner surface 32A of the cover member 11. FIG. 7 is a diagram illustrating a fourth modified embodiment of the second embodiment and is a diagram illustrating a configuration in which a droplet-receiving portion 41 is disposed in a lower-end portion of the second inner surface 32A of the cover member 11.

In the third and fourth modified embodiments of the second embodiment, the droplet-receiving portion 41 or 42 that receives and stores droplets of water is provided in addition to the constituent elements of the second embodiment. As illustrated in FIGS. 6 and 7, the droplet-receiving portion 41 or 42 is disposed to be attached to the second inner surface 32A of the cover member 11 and receives and stores the droplets of water W guided by the second inner surface 32A of the cover member 11.

In the third modified embodiment of the second embodiment, as illustrated in FIG. 6, the droplet-receiving portion 41 is disposed in the upper-end portion of the second inner surface 32A. The droplet-receiving portion 41 is formed to extend in the circumferential direction of the second inner surface 32A. In this way, the droplet-receiving portion 41 can receive and store, on the upper-end side of the second inner surface 32A, the droplets of water W guided toward the outer rim in the radial direction of the cover member 11 in the first inner surface 31A of the cover member 11 and delivered from the upper side toward the lower side along the second inner surface 32A. Therefore, the droplets of water W guided by the first inner surface 31 can be received by the droplet-receiving portion 41 and the droplets of water W can be prevented from adhering to electrical components.

In the fourth modified embodiment of the second embodiment, as illustrated in FIG. 7, the droplet-receiving portion 42 is disposed on the lower-end side of the second inner surface 32A. The droplet-receiving portion 42 is formed to extend in the circumferential direction of the second inner surface 32A. In this way, the droplet-receiving portion 42 can receive and store, on the lower-end side of the second inner surface 32A, the droplets of water W guided toward the outer rim in the radial direction of the cover member 11 in the first inner surface 31A of the cover member 11 and delivered from the upper side toward the lower side along the second inner surface 32A. Therefore, the droplets of water W guided by the first inner surface 31A can be received by the droplet-receiving portion 42 and the droplets of water W can be prevented from adhering to electrical components.

Fifth Modified Embodiment of Second Embodiment

Next, a fifth modified embodiment of the second embodiment will be described. In the fifth modified embodiment of the second embodiment, the first inner surface 31A of the inner surface 30A of the cover member 11 has a water-repellent property. Due to this, the droplets of water W adhering to the inner surface 30A of the cover member 11 can be suppressed from staying on the first inner surface 31A of the cover member 11. Due to this, the droplets of water W adhering to the inner surface 30A of the cover member 11 can be easily guided toward the outer rim in the radial direction of the cover member 11 along the inner surface 31A.

Third Embodiment

Figure 8:
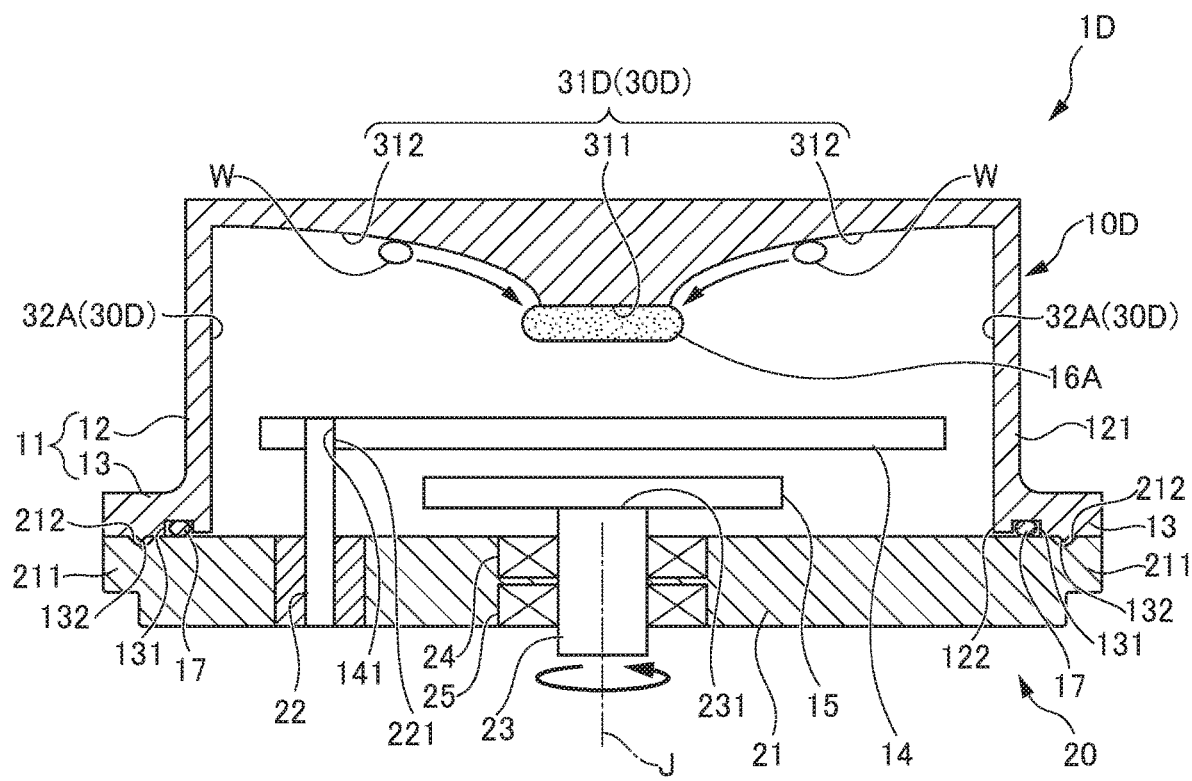
FIG. 8 is a diagram illustrating a motor of a third embodiment of the present invention and is a cross-sectional view illustrating a case in which a rotating shaft member is disposed to extend in an up-down direction.

A motor 1D according to a third embodiment will be described. FIG. 8 is a diagram illustrating the motor 1D of the third embodiment of the present invention and is a cross-sectional view illustrating a case in which the rotating shaft member 23 is disposed to extend in the up-down direction Z. The third embodiment is applied to the motor 1D disposed such that the rotating shaft member 23 is disposed to extend in the up-down direction Z.

The third embodiment is different from the second embodiment in that the rotary encoder includes a hygroscopic material 16A and the constituent elements of the first inner surface 31D of the inner surface 30D of the cover member 11 of the second embodiment. In the third embodiment, similarly to the second embodiment, as illustrated in FIG. 8, the first inner surface 31D is a top surface serving as a ceiling-side surface of the inner surface 30D of the cover member 11 when the rotating shaft member 23 is disposed to extend in the up-down direction Z relative to the arrangement direction of the motor 1D. In the description of the third embodiment, descriptions of the same constituent elements as those in the second embodiment will be omitted.

The first inner surface 31D has a swelling portion 311 formed at the center of the inner surface 31D so as to protrude toward the rotating shaft member 23 and an annular inclined surface 312 formed in an annular form so as to surround the swelling portion 311 of the first inner surface 31D.

The annular inclined surface 312 is formed in a curved form with a downward inclination from the outer rim in the radial direction of the cover member 11 toward the center. The annular inclined surface 312 guides a droplet of water W adhering to the first inner surface 31D of the cover member 11 toward the swelling portion 311 on the central side of the first inner surface 31D.

The lower surface of the swelling portion 311 is formed in a planar form. The hygroscopic material 16A is attached to the lower surface of the swelling portion 311. The hygroscopic material 16A is disposed at a position where the droplets of water W guided by the annular inclined surface 312 of the first inner surface 31D gather. The hygroscopic material 16A absorbs the droplets of water W guided by the annular inclined surface 312 of the first inner surface 31D.

In the first inner surface 31D of the cover member 11 configured in the above-described manner, the droplets of water W adhering to the inner surface 30D of the cover member 11 can be guided toward the center of the first inner surface 31D by the first inner surface 31D, and the guided droplets of water W can be absorbed by the hygroscopic material 16A disposed at the center of the first inner surface 31D. In this way, it is possible to prevent the droplets of water W from adhering to electronic components. Since the hygroscopic material 16A is disposed at the position to which the droplets of water W are guided, it is possible to decrease the number of places where the hygroscopic material 16A is disposed and thereby reduce the amount of the hygroscopic material 16A that is used.

Fourth Embodiment

Figure 9:
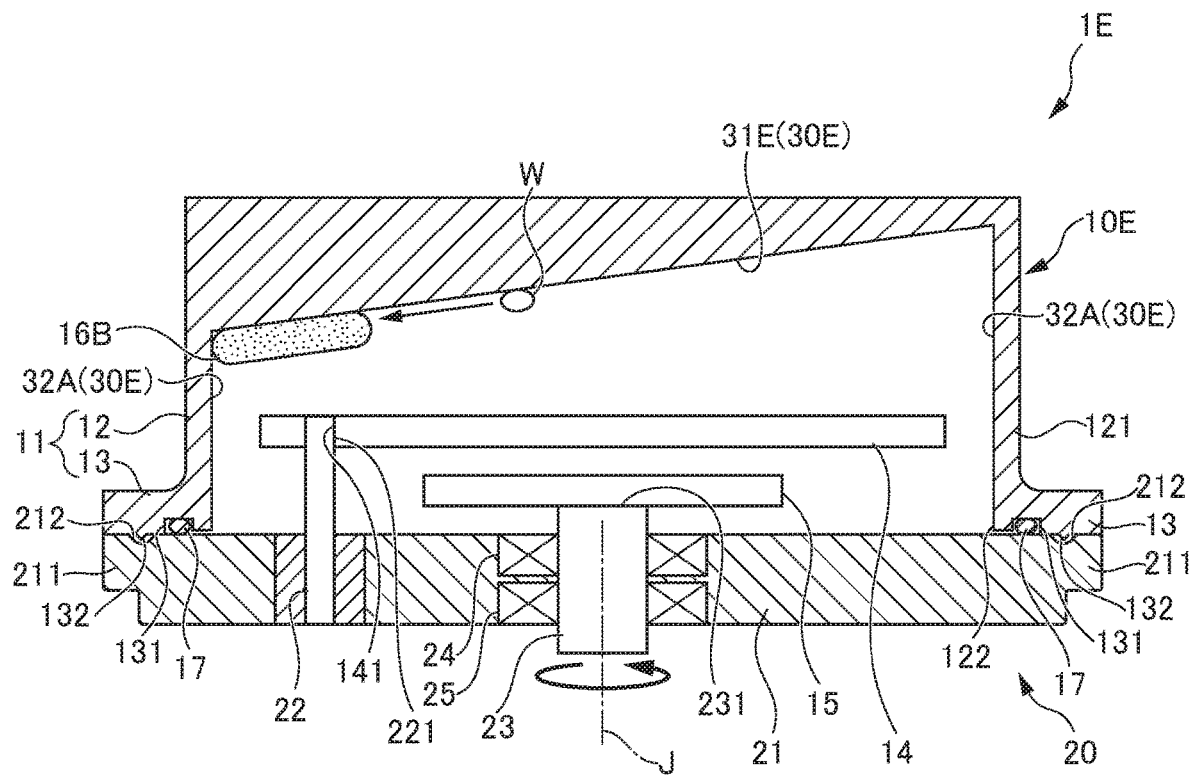
FIG. 9 is a diagram illustrating a motor of a fourth embodiment of the present invention and is a cross-sectional view illustrating a case in which a rotating shaft member is disposed to extend in an up-down direction.

A motor 1E according to a fourth embodiment will be described. FIG. 9 is a diagram illustrating the motor 1E of the fourth embodiment of the present invention and is a cross-sectional view illustrating a case in which the rotating shaft member 23 is disposed to extend in the up-down direction Z. The fourth embodiment is applied to a case in which the rotating shaft member 23 is disposed to extend in the up-down direction Z relative to the arrangement direction of the motor 1.

The fourth embodiment is different from the second embodiment in that the rotary encoder includes a hygroscopic material 16B and the constituent elements of the first inner surface 31E of the inner surface 30E of the cover member 11 of the second embodiment. In the fourth embodiment, similarly to the second embodiment, as illustrated in FIG. 9, the first inner surface 31E is a top surface serving as a ceiling-side surface of the inner surface 30E of the cover member 11 when the rotating shaft member 23 is disposed to extend in the up-down direction Z relative to the arrangement direction of the motor 1E. In the description of the fourth embodiment, descriptions of the same constituent elements as those in the second embodiment will be omitted.

As illustrated in FIG. 9, in a predetermined vertical cross-sectional view including the rotating shaft member 23, the first inner surface 31E is formed in a planar form with a downward inclination as it advances from one side of the first inner surface 31E toward the other side. Due to this, the first inner surface 31E guides droplets of water W adhering to the first inner surface 31E of the cover member 11 toward an edge on the other side of the first inner surface 31E.

The hygroscopic material 16B is bonded to the lower surface of the lower-end portion of the first inner surface 31E at the edge on the other side of the first inner surface 31E. The hygroscopic material 16B is disposed at a position where the droplets of water W guided by the first inner surface 31E gather. The hygroscopic material 16B absorbs the droplets of water W guided by the first inner surface 31E.

In the first inner surface 31E of the cover member 11 configured in this manner, the droplets of water W adhering to the inner surface 30E of the cover member 11 can be guided to the edge on the other side of the first inner surface 31E by the first inner surface 31E, and the guided droplets of water W can be absorbed by the hygroscopic material 16B disposed at the edge on the other side of the first inner surface 31E. In this way, it is possible to prevent the droplets of water W from adhering to electronic components. Since the hygroscopic material 16B is disposed at a position to which the droplets of water W are guided, it is possible to decrease the number of places where the hygroscopic material 16B is disposed and to reduce the use amount of the hygroscopic material 16B.

The present invention is not limited to the respective embodiments described above, but modifications and improvements made within a range where the object of the present invention can be achieved fall within the scope of the present invention. For example, the constituent elements of the first embodiment, the second embodiment (including the first to fifth modified embodiments), and the third embodiment can be combined arbitrarily. For example, the inclined portion of the first inner surface 31, 31A, 31B, 31C, 31D, or 31E and/or the second inner surface 32, 320, or 32A of the cover member 11 may be formed in an inclined planar form similarly to the third embodiment and may be formed in a curved form similarly to the first and second embodiments. Both the first inner surface 31, 31A, 31B, 31C, 31D, or 31E and the second inner surface 32, 320, or 32A of the cover member 11 may have an inclined portion and any one of the first and second inner surfaces may have an inclined portion.

The parallel groove 33, the radial groove 34, and the droplet-receiving portion 41 or 42 of the modified embodiments of the second embodiment may be formed in the first inner surface 31, 31D, or 31E of the cover member 11 of the first, third, and fourth embodiments.

The first inner surface 31, 31A, 31B, 31C, 31D, or 31E and/or the second inner surface 32, 320, or 32A of the cover member 11 may have both a groove (a parallel groove or a radial groove) for guiding droplets of water W and the hygroscopic material 16, and may have both a groove (a parallel groove or a radial groove) for guiding droplets of water W and the droplet-receiving portion 41 or 42.

EXPLANATION OF REFERENCE NUMERALS 1, 1A, 1B, 1C, 1D, 1E: Motor
10, 10A, 10B, 10C, 10D, 10E: Rotary encoder
11: Cover member
16, 16A, 16B: Hygroscopic material
20: Motor main body
23: Rotating shaft member
30, 30A, 30B, 30C, 30D, 30E: Inner surface
31, 31A, 31B, 31C, 31D, 31E: First inner surface (First top surface)
33: Parallel groove (Groove)
34: Radial groove (Groove)
41: Droplet-receiving portion
42: Droplet-receiving portion
320: Second inner surface (Second top surface)
W: Droplet of water

What is claimed is:

1. A motor comprising:
a motor main body having a rotating shaft member; and
a rotary encoder, wherein
the rotary encoder has a cover member, and
an inner surface of the cover member has a first top surface formed having an inclined portion that is inclined relative to a horizontal direction so as to guide a droplet of water when the rotating shaft member is disposed to extend in a vertical direction, and a second top surface formed having an inclined portion that is inclined relative to a horizontal direction so as to guide a droplet of water when the rotating shaft member is disposed to extend in a horizontal direction, wherein a groove for guiding a droplet of water is formed in the first top surface and/or the second top surface, the groove being linear and extending in a predetermined direction when viewing the first top surface and the second top surface from inside the cover member, and a hygroscopic material is disposed to be bonded to the first top surface and the second top surface at the boundary between the first top surface and the second top surface of the inner surface of the cover member, and absorbs the droplets of water guided by the first top surface and the second top surface.

2. The motor according to claim 1, wherein an inclined portion of the first top surface and an inclined portion of the second top surface is formed in a curved form.

3. The motor according to claim 1, further comprising:

a droplet-receiving portion disposed in an inner surface of the cover member to receive and store the droplet of water guided by the inner surface of the cover member.

4. The motor according to claim 1, wherein a surface of the first top surface and/or the second top surface has a water-repellent property.

5. The motor according to claim 1, wherein the groove has a terminus at a center of the first top surface, and extends in a predetermined direction from the center of the first top surface towards the motor main body when viewing the first top surface and the second top surface from inside the cover member.

* * * * *